(12) United States Patent
Gong (10) Patent No.: US 8,861,392 B2
(45) Date of Patent: Oct. 14, 2014

(54) PRE-CODING METHOD IN COOPERATIVE RELAY SYSTEM, COMMUNICATION APPARATUS, AND RELAY APPARATUS

(75) Inventor: Zhengwei Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 13/430,873

(22) Filed: Mar. 27, 2012

(65) Prior Publication Data

US 2012/0188932 A1 Jul. 26, 2012

Related U.S. Application Data

(63) Continuation of application No. PCT/CN2010/077324, filed on Sep. 27, 2010.

(30) Foreign Application Priority Data

Sep. 28, 2009 (CN) .......................... 2009 1 0177267

(51) Int. Cl.
| | |
|---|---|
| *H04L 12/26* | (2006.01) |
| *H04B 7/216* | (2006.01) |
| *H04B 7/185* | (2006.01) |
| *H04W 72/00* | (2009.01) |
| *H04B 7/00* | (2006.01) |
| *H04B 7/04* | (2006.01) |
| *H04B 7/155* | (2006.01) |
| *H04B 7/06* | (2006.01) |
| *H04B 7/02* | (2006.01) |
| *H04L 1/06* | (2006.01) |
| *H04L 1/00* | (2006.01) |

(52) U.S. Cl.
CPC ............ *H04B 7/15592* (2013.01); *H04B 7/043* (2013.01); *H04B 7/0452* (2013.01); *H04B 7/0697* (2013.01); *H04B 7/0626* (2013.01); *H04B 7/026* (2013.01); *H04L 2001/0097* (2013.01); *H04B 7/0634* (2013.01); *H04L 1/0026* (2013.01); *H04L 1/06* (2013.01); *H04B 7/0639* (2013.01)

USPC .......... 370/252; 370/320; 370/335; 370/342; 455/13.1; 455/450; 455/509

(58) Field of Classification Search
USPC .................. 375/267; 370/252, 320, 335, 342; 455/13.1, 450, 509
See application file for complete search history.

(56) References Cited

U.S. PATENT DOCUMENTS

| 7,778,598 B2 * | 8/2010 | Devroye et al. ............... 455/13.4 |
| 8,401,094 B2 * | 3/2013 | Pan et al. ...................... 375/260 |

(Continued)

FOREIGN PATENT DOCUMENTS

| CN | 101232356 A | 7/2008 |
| CN | 101359950 A | 2/2009 |

(Continued)

OTHER PUBLICATIONS

Song, Yang "IEEE C802.16m-9/0153", Jan. 5, 2009, p. 1-5.*
Chinese Office Action mailed Jul. 10, 2013 in corresponding Chinese Application No. 200910177267.7.

(Continued)

*Primary Examiner* — Alpus H Hsu
*Assistant Examiner* — Camquyen Thai
(74) *Attorney, Agent, or Firm* — Staas & Halsey LLP (57) ABSTRACT

The embodiments of the present invention disclose a pre-coding method in a cooperative relay system. The pre-coding method in the cooperative relay system includes: obtaining pre-coding matrixes of local optimal sub-channels to single links of respective relay stations; and obtaining a pre-coding matrix of a synthesized optimal sub-channel according to the pre-coding matrix of each local optimal sub-channel. The embodiments of the present invention also disclose a communication apparatus and a relay apparatus. The present invention is applicable to pre-coding between a transmitter and a relay station in a cooperative relay system.

13 Claims, 8 Drawing Sheets

(56) References Cited

U.S. PATENT DOCUMENTS

| | | |
|---|---|---|
| 8,520,494 B2 * | 8/2013 | Yang et al. ............ 370/204 |
| 2005/0101259 A1 | 5/2005 | Tong et al. |
| 2008/0260059 A1 * | 10/2008 | Pan ........................ 375/260 |
| 2008/0318520 A1 | 12/2008 | Kwun et al. |
| 2009/0225889 A1 * | 9/2009 | Tsai et al. .............. 375/267 |
| 2010/0027458 A1 * | 2/2010 | Wu et al. ................ 370/315 |
| 2012/0039419 A1 * | 2/2012 | Maddah-Ali et al. ... 375/340 |

FOREIGN PATENT DOCUMENTS

| | | | |
|---|---|---|---|
| CN | 101505171 A | | 8/2009 |
| WO | WO 2006/0088400 | | 8/2006 |
| WO | WO 2009/023532 A2 | | 2/2009 |
| WO | WO 2009/026741 A1 | | 3/2009 |
| WO | WO 2009136736 A2 | * | 11/2009 |
| WO | WO 2010015640 A2 | * | 2/2010 |
| WO | WO 2010063317 A1 | * | 6/2010 |

OTHER PUBLICATIONS

European Search report mailed Oct. 1, 2012 in corresponding European Application No. 10818422.7.

Chinese Office action mailed Nov. 2, 2012 in corresponding Chinese Application No. 200910177267.7.

International Search Report of the International Searching Authority related to Application No. PCT/CN2010/077324; filed Sep. 27, 2010; mailed Dec. 30, 2010; Huawei Tech Co., Ltd. (4 pgs.).

Written Opinion of the International Searching Authority related to Application No. PCT/CN2010/077324; filed Sep. 27, 2010; mailed Dec. 30, 2010; Huawei Tech Co., Ltd. (6 pgs.).

Love et al.; "Grassmannian Beamforming for Multiple-Input Multiple-Output Wireless Systems"; IEEE Transactions on Information Theory, vol. 49, No. 10, Oct. 2003 (13 pgs.).

Spencer et al.; "Zero-Forcing Methods for Downlink Spatial Multiplexing in Multiuser MIMO Channels"; IEEE Transactions on Signal Processing, vol. 52, No. 2, Feb. 2004 (11 pgs.).

\* cited by examiner

PRE-CODING METHOD IN COOPERATIVE RELAY SYSTEM, COMMUNICATION APPARATUS, AND RELAY APPARATUS

CROSS-REFERENCE TO RELATED APPLICATIONS

This application is a continuation of International Application No. PCT/CN2010/077324, filed on Sep. 27, 2010, which claims priority to Chinese Patent Application No. 200910177267.7, filed on Sep. 28, 2009, both of which are hereby incorporated by reference in their entireties.

FIELD OF THE INVENTION

The present invention relates to the field of wireless communication technologies, and in particular, to a pre-coding method in a cooperative relay system, a communication apparatus, and a relay apparatus.

BACKGROUND OF THE INVENTION

With the rapid development of wireless communication services, a future network needs a layout and design with the lowest cost to support communications at a blind area or a hotspot area, for providing better coverage or a better system throughput, and therefore, a relay technology is introduced. In a common relay network, a data packet is sent from a transmitter to a receiver via a single path and through a relay station with multiple continuous hops.

In order to provide a higher data transmission rate within a broader coverage range, a cooperative relay technology is introduced. In a cooperative relay network, one or more relay stations are disposed between the transmitter and the receiver, and during data transmission process, the relay stations are cooperative with each other when transmitting a data packet in parallel. With a broadcast characteristic that a wireless channel can reach multiple relay stations simultaneously, the relay stations are enabled to work cooperatively, thus reducing power consumption for transmitting the data packet from the transmitter to the receiver, and significantly increasing gains of a total throughput and power efficiency.

Before the data transmission, pre-coding needs to be performed at the transmitter, and in the prior art, for a point-to-multipoint multi-user, a pre-coding scheme is:

A transmitter transmits a plurality of different data packets to a plurality of different receivers simultaneously through multi-antenna channels, and at this time, pre-coding at the transmitter enables different data packets to be transmitted in parallel on respective single link channels. Pre-coding information at the transmitter is obtained by calculating channel information from the transmitter to all the receivers, where the channel information is known by the transmitter; and may also be obtained by calculating feedback of all the receivers.

Figure 1:
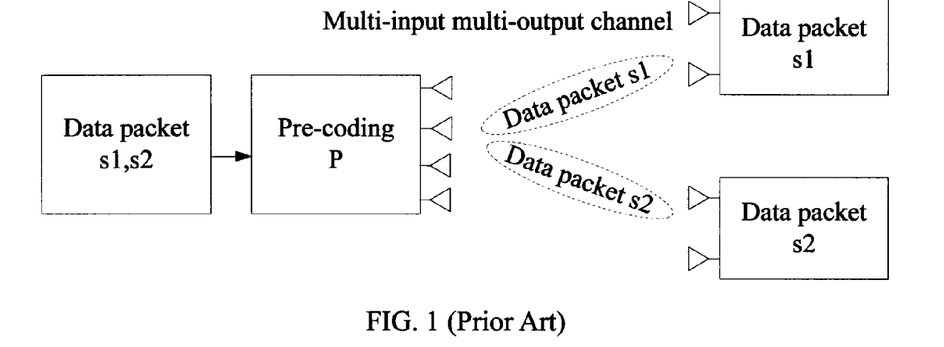
FIG. 1 is a block diagram of point-to-multipoint data transmission in the prior art.

As shown in FIG. 1, output signals of different receivers may be represented as:

$$\begin{cases} y_1 = H_1 Ps + n_1 = H_1 p_1 s_1 + (H_1 p_2 s_2 + n_1) \\ y_2 = H_2 Ps + n_2 = H_2 p_2 s_2 + (H_2 p_1 s_1 + n_2), \end{cases}$$

where, $H_1$ and $H_2$ respectively are single link channel information from the transmitter to different receivers, $p_1$ and $p_2$ are optimal pre-coding information corresponding to different receivers, $n_1$ and $n_2$ are additive noise vectors on different receivers, and contents in the brackets are interference signals received by the receivers.

In the implementation of the present invention, the inventor finds that the prior art has at least the following problem.

In conventional pre-coding design directed to a point-to-multipoint transmission scenario, a transmitter transmits a plurality of different data packets to a plurality of different receivers simultaneously through multi-antenna channels. In a cooperative relay system, the transmitter needs to transmit the same data to a plurality of different receivers simultaneously, and if the transmitter still adopts the preceding method for pre-coding, each receiver cannot obtain similarly good transmission performance.

SUMMARY OF THE INVENTION

The embodiments of the present invention provide a pre-coding method in a cooperative relay system, a communication apparatus, and a relay apparatus, so that a transmitter can transmit the same information to different relay stations simultaneously with similarly good transmission performance.

The technical solutions adopted in the embodiments of the present invention are:

A pre-coding method in a cooperative relay system includes:

obtaining pre-coding matrixes of local optimal sub-channels which are from a transmitter to respective relay stations; and obtaining a pre-coding matrix of a synthesized optimal sub-channel according to the pre-coding matrix of each local optimal sub-channel.

A pre-coding method in a cooperative relay system includes:

receiving data that is coded through a pre-coding matrix of a synthesized optimal sub-channel and transmitted by a transmitter, where the pre-coding matrix of the synthesized optimal sub-channel is determined through pre-coding matrixes of local optimal sub-channels which are from the transmitter to respective relay stations.

A communication apparatus includes:

a first obtaining module, configured to obtain pre-coding matrixes of local optimal sub-channels which are from the communication apparatus to respective relay stations; and a second obtaining module, configured to obtain a pre-coding matrix of a synthesized optimal sub-channel according to the pre-coding matrix of each local optimal sub-channel.

A relay apparatus includes:

a receiving module, configured to receive data that is coded through a pre-coding matrix of a synthesized optimal sub-channel and transmitted by a transmitter, where the pre-coding matrix of the synthesized optimal sub-channel is determined through pre-coding matrixes of local optimal sub-channels which are from the transmitter to respective relay apparatuses.

With the pre-coding method in the cooperative relay system, the communication apparatus, and the relay apparatus according to the embodiments of the present invention, a transmitter can obtain a pre-coding matrix of a synthesized optimal sub-channel according to pre-coding matrixes of local optimal sub-channels which are from the transmitter to respective relay stations, and transmit data that is coded through the pre-coding matrix of the synthesized optimal sub-channel to respective relay stations. Compared with the prior art, the transmitter can transmit data that is coded through the pre-coding matrix of the synthesized optimal sub-channel to different relay stations simultaneously through the synthesized optimal sub-channel, and therefore, transmission performance of a first hop to multiple points in the cooperative relay system is improved, so that performance of respective relay stations is similar and optimal, thus ensuring cooperative transmission performance of a second hop, and realizing optimal pre-processing of the transmitter.

BRIEF DESCRIPTION OF THE DRAWINGS

To describe the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art may also derive other drawings from these accompanying drawings without creative efforts.

DETAILED DESCRIPTION OF THE EMBODIMENTS

The technical solutions in the embodiments of the present invention are clearly and completely described in the following with reference to the accompanying drawings in the embodiments of the present invention. Apparently, the embodiments to be described are only a part rather than all of the embodiments of the present invention. Based on the embodiments of the present invention, all other embodiments obtained by persons skilled in the art without creative efforts shall fall within the protection scope of the present invention.

In order to make advantages of the technical solutions in the present invention clearer, the present invention is described in details in the following with reference to the accompanying drawings and embodiments.

Figure 2:
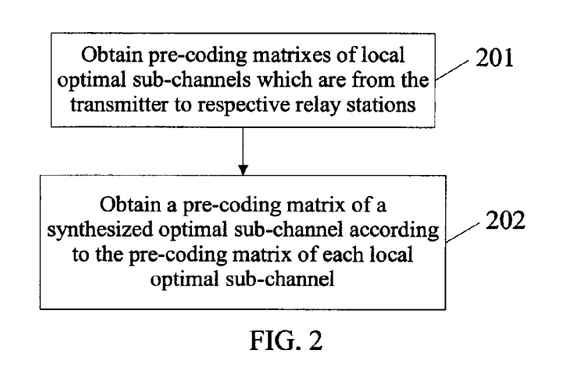
FIG. 2 is a flow chart of a pre-coding method in a cooperative relay system according to an embodiment of the present invention.
Figure 3:
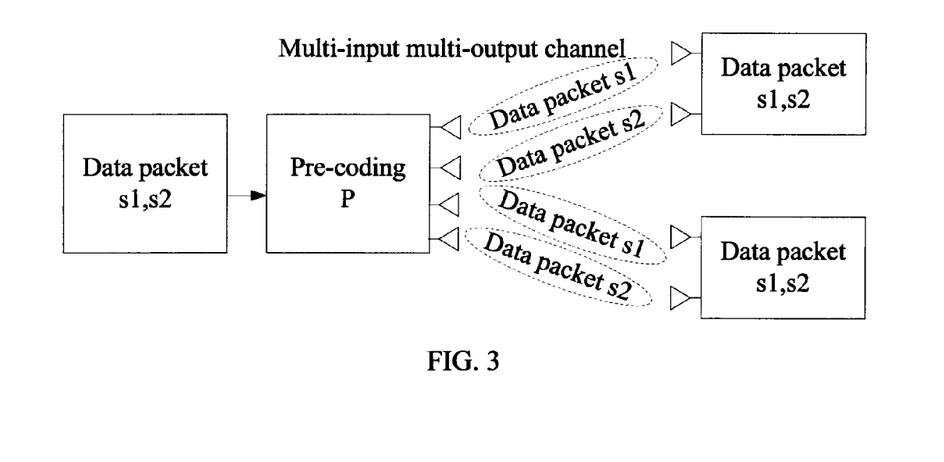
FIG. 3 is a block diagram of point to multipoint data transmission of a first hop in a cooperative relay system according to an embodiment of the present invention.

As shown in FIG. 2, an embodiment of the present invention provides a pre-coding method in a cooperative relay system; and FIG. 3 is a block diagram of point to multipoint data transmission of a first hop in a cooperative relay system according to an embodiment of the present invention. The cooperative relay system has a plurality of different relay stations, a transmitter transmits the same multi-stream information S to the plurality of different relay stations, and the transmitter may be a base station or a user terminal. The multi-stream information S is formed by S1 and S2, where S1 and S2 are respectively transmitted on different antennas. The transmitter is designed with a corresponding pre-coding matrix P, and after being performed pre-coding processing, a signal vector S to be transmitted is transmitted to the plurality of different relay stations.

As shown in FIG. 2, at the transmitter, the pre-coding method in the cooperative relay system includes:

Step 201: Obtain pre-coding matrixes of local optimal sub-channels which are from the transmitter to respective relay stations.

Step 202: Obtain a pre-coding matrix of a synthesized optimal sub-channel according to the pre-coding matrix of each local optimal sub-channel.

Single links are established between the transmitter and respective relay stations, each single link includes a plurality of sub-channels, and the local optimal sub-channel is one or more of the plurality of sub-channels in a certain single link. It can be known from a pre-coding theory that, pre-coding indicates that data is mapped to one or more optimal sub-channels of multi-antenna channels for transmission, and therefore, the pre-coding matrixes of the local optimal sub-channels may ensure that the data is transmitted respectively on the local optimal sub-channel of the single links from the transmitter to the different relay stations. In order to ensure that respective relay stations have similar and optimal transmission performance, it is required to ensure that the data is transmitted on the synthesized optimal sub-channel formed by the local optimal sub-channels of the single links, and therefore the pre-coding matrix of the synthesized optimal sub-channel needs to be obtained.

With the pre-coding method in the cooperative relay system according to this embodiment of the present invention, the transmitter can obtain the pre-coding matrix of the synthesized optimal sub-channel according to the pre-coding matrixes of the local optimal sub-channels which are from the transmitter to respective relay stations. Compared with the prior art, the transmitter can transmit data that is coded through the pre-coding matrix of the synthesized optimal sub-channel to different relay stations simultaneously through the synthesized optimal sub-channel, and therefore, performance of point to multipoint transmission of a first hop in the cooperative relay system is improved, so that respective relay stations have similar and optimal performance, thus ensuring cooperative transmission performance of a second hop, and realizing optimal pre-processing of the transmitter.

Figure 4:
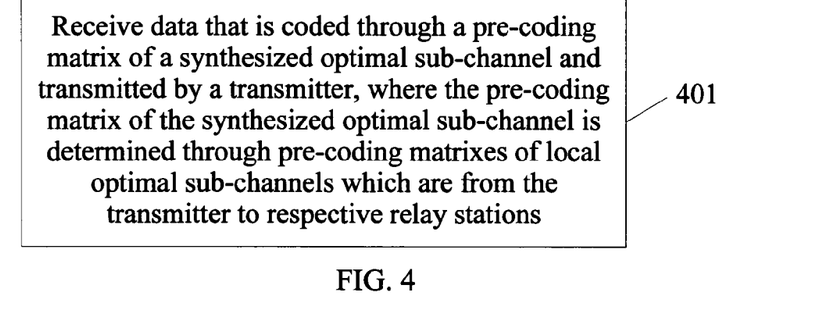
FIG. 4 is a flow chart of a pre-coding method in a cooperative relay system according to an embodiment of the present invention.

As shown in FIG. 4, an embodiment of the present invention provides a pre-coding method in a cooperative relay system. In a relay station, the pre-coding method in the cooperative relay system includes:

Step 401: Receive data that is coded through a pre-coding matrix of a synthesized optimal sub-channel and transmitted by a transmitter.

The pre-coding matrix of the synthesized optimal sub-channel is determined through pre-coding matrixes of local optimal sub-channels which are from the transmitter to respective relay stations.

With the pre-coding method in the cooperative relay system according to this embodiment of the present invention, the relay station can receive the data that is coded through the pre-coding matrix of the synthesized optimal sub-channel and transmitted from the transmitter, and the pre-coding matrix of the synthesized optimal sub-channel is determined through the pre-coding matrixes of the local optimal sub-channels which are from the transmitter to respective relay stations. Compared with the prior art, different relay stations can simultaneously receive the data that is coded through the pre-coding matrix of the synthesized optimal sub-channel and transmitted by the transmitter through the synthesized optimal sub-channel, and therefore, performance of point to multipoint transmission of a first hop in the cooperative relay system is improved, so that respective relay stations have similar and optimal performance, thus ensuring cooperative transmission performance of a second hop, and realizing that different relay stations receive data with similarly good transmission performance.

Figure 5:
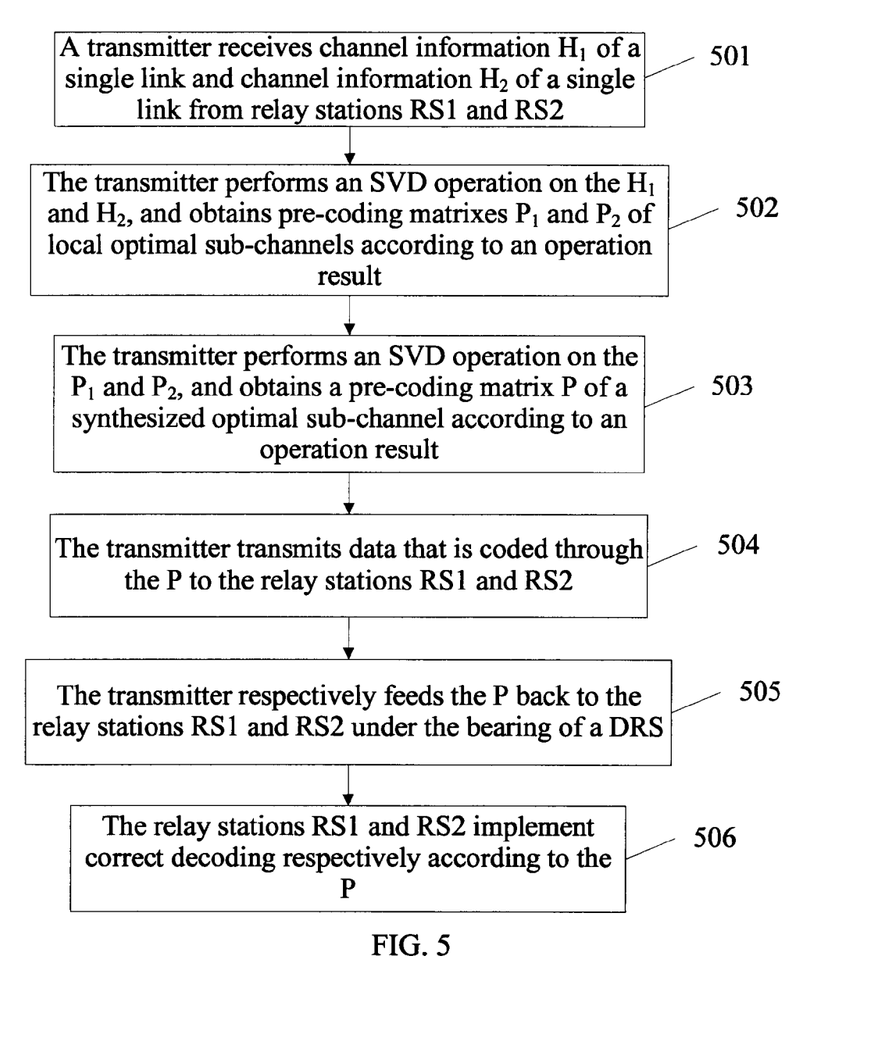
FIG. 5, FIG. 6, FIG. 7, and FIG. 8 are flow charts of a pre-coding method in a cooperative relay system according to an embodiment of the present invention.
Figure 5A:
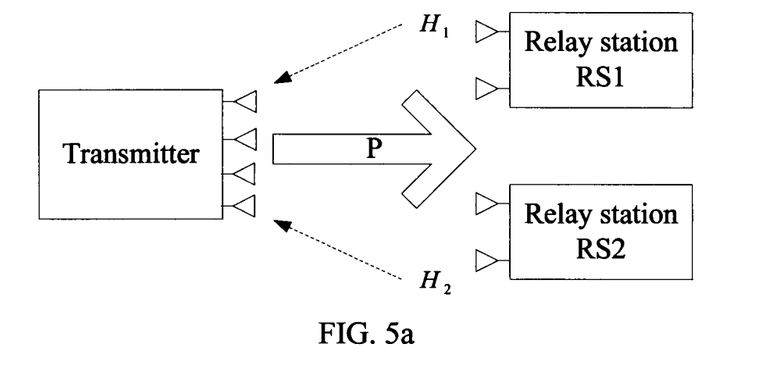
FIG. 5a, FIG. 6a, FIG. 7a, and FIG. 8a are schematic diagrams of a pre-coding method in a cooperative relay system according to an embodiment of the present invention.

As shown in FIG. 5, an embodiment of the present invention provides a pre-coding method in a cooperative relay system. As shown in FIG. 5a, the cooperative relay system includes two relay stations RS1 and RS2, and a transmitter respectively receives channel information $H_1$ and $H_2$ of single links, where the channel information $H_1$ and $H_2$ of the single links are transmitted by the relay stations RS1 and RS2, and transmits a pre-coding matrix of a synthesized optimal sub-channel P to the relay stations RS1 and RS2 respectively.

The transmitter transmits the same multi-stream information S to the two different relay stations RS1 and RS2, and the transmitter may be a base station or a user terminal. The transmitter has 4 antennas, the two relay stations RS1 and RS2 each have 2 receiving antennas, the transmitter transmits 2 information streams to respective relay stations, and the multi-stream information S is formed by S1 and S2, where S1 and S2 are transmitted respectively on different antennas.

The transmitter is designed with a corresponding pre-coding matrix P, and after being performed pre-coding processing, a plurality of information streams S is transmitted to the relay stations RS1 and RS2. Output signals of the relay stations RS1 and RS2 are shown in formula (1):

$$\begin{cases} y_1 = H_1 PS + n_1 \\ y_2 = H_2 PS + n_2 \end{cases} \quad (1)$$

where, $H_1$ represents channel information of a single link which is from the transmitter to the relay station RS1, $H_2$ represents channel information which is from the transmitter to the relay station RS2; $n_1$ represents an additive noise vector of the relay station RS1, and $n_2$ represents an additive noise vector of the relay station RS2.

It can be known from the formula (1) that, in order to obtain the output signals $y_1$ and $y_2$ of the relay stations RS1 and RS2, the pre-coding matrix P at the transmitter needs to be obtained. As shown in FIG. 5, the pre-coding method in the cooperative relay system includes:

Step 501: The transmitter receives channel information $H_1$ of the single link which is from the transmitter to the relay station RS1, and channel information $H_2$ of the single link which is from the transmitter to the relay station RS2, where the channel information $H_1$ of the single link is sent by the relay station RS1, and the channel information $H_2$ of the single link is sent by the relay station RS2.

Step 502: The transmitter performs a Singular Value Decomposition (SVD) operation on the channel information $H_1$ and $H_2$ of the single links:

$$\begin{cases} H_1 = U_1 \Sigma_1 V_1^H \\ H_2 = U_2 \Sigma_2 V_2^H \end{cases} \quad (2)$$

where, $U_1$, $V_1$ and $U_2$, $V_2$ are all 4×4 unitary matrixes, $\Sigma_1$ and $\Sigma_2$ are diagonal matrixes, $(X)^H$ is a conjugate transpose (Hermitian) operation of a matrix X, and X may be $V_1$ or $V_2$.

According to a result of the SVD operation of the formula (2), the transmitter obtains the pre-coding matrixes $P_1$ and $P_2$ of the local optimal sub-channels, as shown in formula (3):

$$\begin{cases} P_1 = V_1^{1:2} \\ P_2 = V_2^{1:2} \end{cases} \quad (3)$$

where, $(X)^{1:2}$ are respectively sub-matrixes which are constructed by first two columns of the matrix X, and X may be $V_1$ or $V_2$.

Step 503: The transmitter performs an SVD operation on the obtained $P_1$ and $P_2$, $$[P_1 P_2] = U \Sigma V^H \quad (4)$$

where, both U and V are 4×4 unitary matrixes, $\Sigma$ is a diagonal matrix, and $(V)^H$ is a conjugate transpose (Hermitian) operation of the matrix V.

According to a result of the SVD operation, the transmitter obtains the pre-coding matrix P of the synthesized optimal sub-channel, as shown in formula (5):

$$P = U^{1:2} \quad (5)$$

where, $U^{1:2}$ is a sub-matrix that is constructed by first two columns of the matrix U.

Step 504: The transmitter transmits data that is coded through the pre-coding matrix P of the synthesized optimal sub-channel to the relay stations RS1 and RS2.

To further enable the relay station to implement correct decoding, the transmitter may further feed pre-coding information that is adopted by the transmitter back to the relay station, and therefore, this embodiment of the present invention further includes:

Step 505: The transmitter respectively feeds the pre-coding matrix P of the synthesized optimal sub-channel back to the relay stations RS1 and RS2 under the bearing of a Dedicated Reference Signal (DRS).

Step 506: The relay stations RS1 and RS2 respectively implement correct decoding on the received data according to the pre-coding matrix P of the synthesized optimal sub-channel.

With the pre-coding method in the cooperative relay system according to this embodiment of the present invention, the transmitter can obtain the pre-coding matrix of the synthesized optimal sub-channel according to the pre-coding matrixes of the local optimal sub-channels which are from the transmitter to respective relay stations, and transmit data that is coded through the pre-coding matrix of the synthesized optimal sub-channel to respective relay stations, and therefore, performance of point to multipoint transmission of a first hop in the cooperative relay system is improved, so that respective relay stations have similar and optimal performance, thus ensuring cooperative transmission performance of a second hop, and realizing optimal pre-processing of the transmitter. In addition, the transmitter can feed the pre-coding matrix of the synthesized optimal sub-channel back to respective relay stations, so that respective relay stations can implement correct decoding, thus ensuring correct receiving and transmitting of data in the cooperative relay system, and reducing a feedback overhead of the system.

Figure 6:
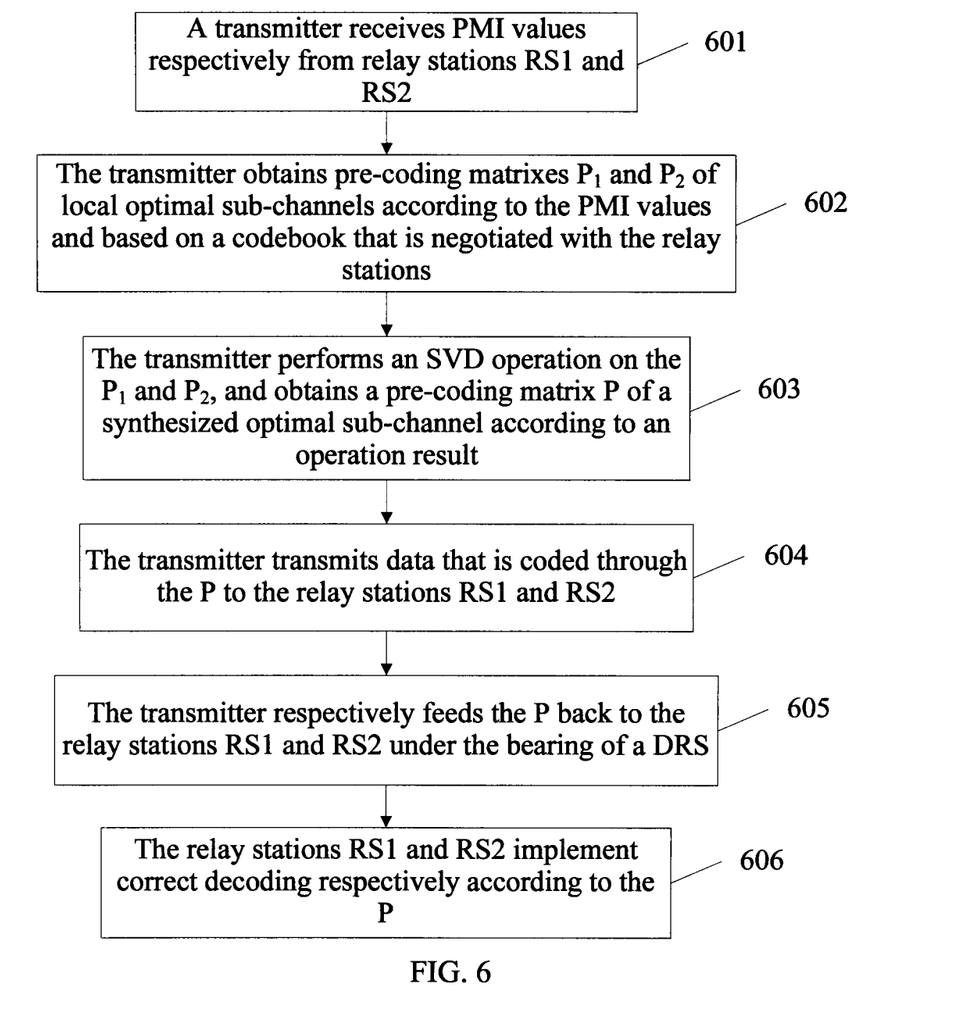
Figure 6A:
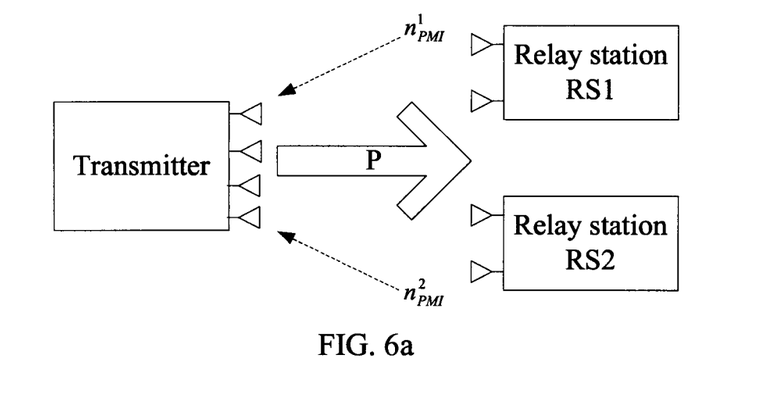

As shown in FIG. 6, an embodiment of the present invention provides a pre-coding method in a cooperative relay system. As shown in FIG. 6a, the cooperative relay system includes two relay stations RS1 and RS2, and a transmitter respectively receives local Pre-coding Matrix Indication (PMI) values $n_{PMI}^1$ and $n_{PMI}^2$ which are transmitted by the relay stations RS1 and RS2, and transmits a pre-coding matrix P of a synthesized optimal sub-channel respectively to the relay stations RS1 and RS2.

As shown in FIG. 6, the pre-coding method in the cooperative relay system includes:

Step 601: The transmitter receives a PMI value $n_{PMI}^1$ transmitted by the relay station RS1, and a PMI value $n_{PMI}^2$ transmitted by the relay station RS2.

Step 602: The transmitter obtains pre-coding matrixes $P_1$ and $P_2$ of local optimal sub-channels according to the PMI values $n_{PMI}^1$ and $n_{PMI}^2$, and based on a codebook C that is negotiated with the relay stations:

$$\begin{cases} P_1 = C_{n_{PMI}^1} \\ P_2 = C_{n_{PMI}^2} \end{cases} \quad (6)$$

During pre-coding based on the codebook, the transmitter and the relay stations set a codebook C before communication, and the codebook C includes several pre-coding code words, that is, $C=\{C_1, C_2, \ldots, C_N\}$. The pre-coding based on the codebook may effectively reduce a feedback overhead of the channel.

Before the transmitter transmits information, according to a current channel characteristic, the relay station may select a pre-coding code word that is considered as the best one from the codebook C (at this time, if the transmitter performs pre-coding by adopting the code word and then transmits the information, a receiver obtains optimal performance), and feed a corresponding index of the code word in the codebook back to the transmitter. According to feedback information, the transmitter then selects a code word corresponding to the index from the codebook, so as to perform pre-coding on a transmitted signal. That is to say, in the pre-coding based on the codebook, the feedback information is in a form of the index that is corresponding to the code word.

Steps 603 to 606: Obtain a pre-coding matrix P of a synthesized optimal sub-channel according to the obtained $P_1$ and $P_2$, and furthermore, the transmitter may feed pre-coding information that is adopted by the transmitter back to the relay stations, and details may be made reference to steps 503 to 506, which are not repeated herein.

With the pre-coding method in the cooperative relay system according to this embodiment of the present invention, the transmitter can obtain the pre-coding matrix of the synthesized optimal sub-channel according to the pre-coding matrixes of the local optimal sub-channels which are from the transmitter to respective relay stations, and transmit data that is coded through the pre-coding matrix of the synthesized optimal sub-channel to respective relay stations, and therefore, performance of point to multipoint transmission of a first hop in the cooperative relay system is improved, so that respective relay stations have similar and optimal performance, thus ensuring cooperative transmission performance of a second hop, and realizing optimal pre-processing of the transmitter. In addition, the transmitter can feed the pre-coding matrix of the synthesized optimal sub-channel back to respective relay stations, so that respective relay stations can implement correct decoding, thus ensuring correct receiving and transmitting of data in the cooperative relay system, and reducing a feedback overhead of the system.

Figure 7:
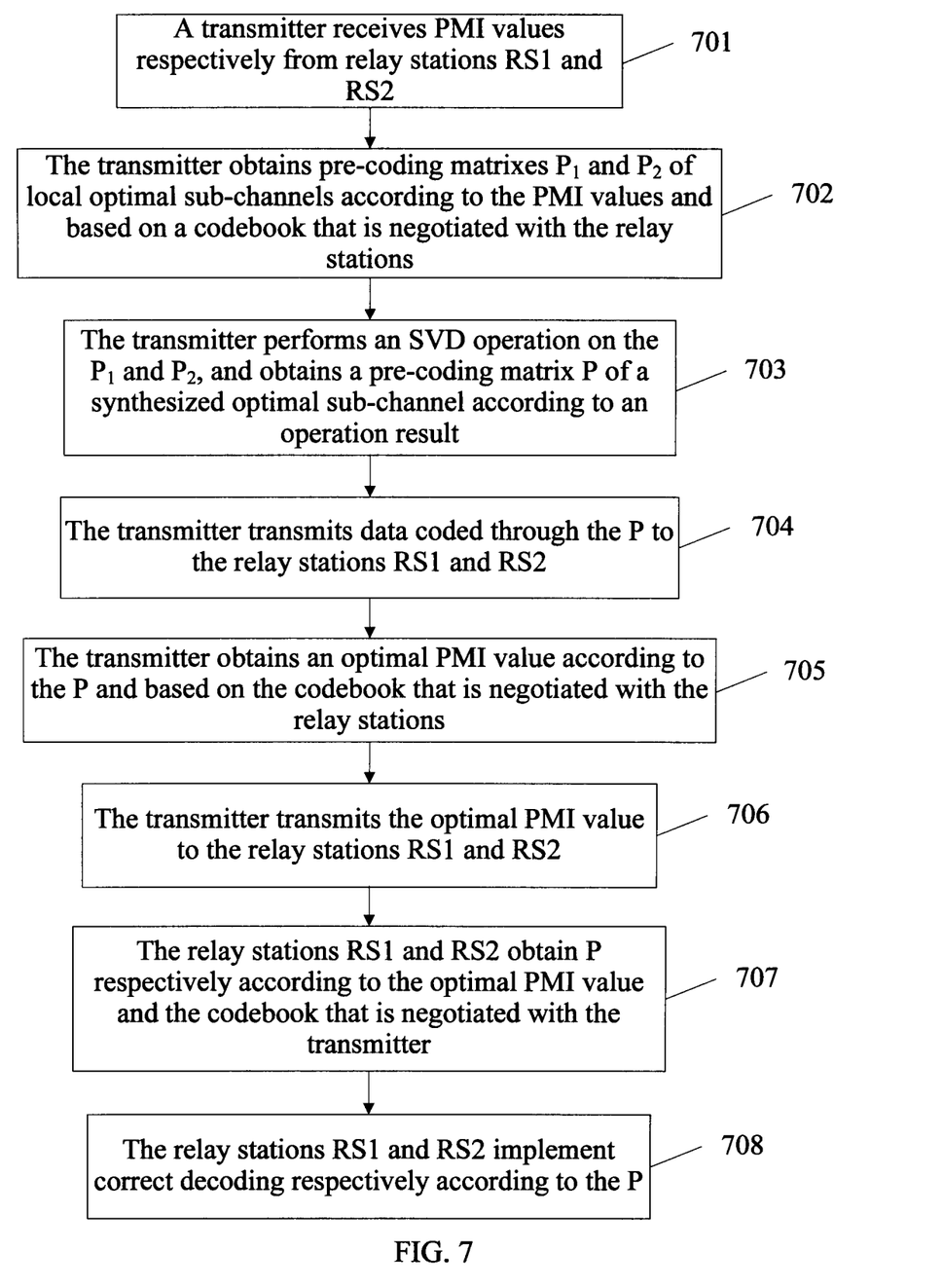
Figure 7A:
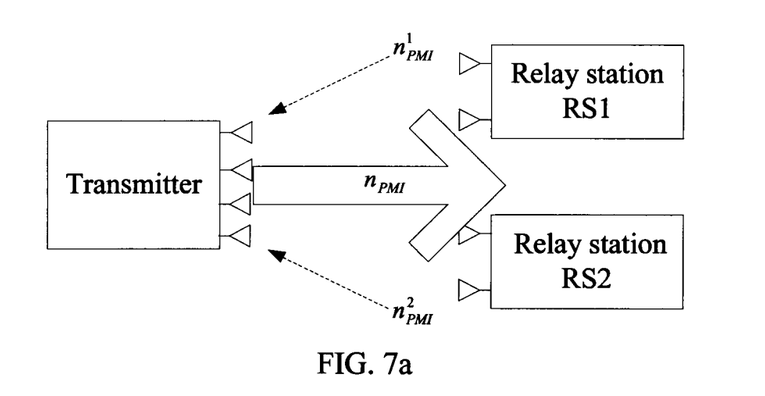

As shown in FIG. 7, an embodiment of the present invention provides a pre-coding method in a cooperative relay system. As shown in FIG. 7a, the cooperative relay system includes two relay stations RS1 and RS2, and a transmitter respectively receives local PMI values $n_{PMI}^1$ and $n_{PMI}^2$ which are transmitted by the relay stations RS1 and RS2, and transmits an optimal PMI value $n_{PMI}$ that is corresponding to a pre-coding matrix P of a synthesized optimal sub-channel to the relay stations RS1 and RS2.

As shown in FIG. 7, the pre-coding method in the cooperative relay system includes:

Steps 701 to 702: Referring to steps 601 to 602, determine a pre-coding matrix of each local optimal sub-channel through PMI values which are transmitted by the relay stations.

Steps 703 to 704: Referring to steps 503-504, obtain the pre-coding matrix P of the synthesized optimal sub-channel according to obtained $P_1$ and $P_2$.

Furthermore, in this embodiment of the present invention, the transmitter may feed pre-coding information that is adopted by the transmitter back to the relay stations, so that the relay stations implement correct decoding. Therefore, this embodiment of the present invention may further include:

Step 705: According to the pre-coding matrix P of the synthesized optimal sub-channel and a codebook C that is negotiated with the relay stations, the transmitter obtains an optimal PMI value $n_{PMI}$ that is corresponding to the pre-coding matrix P of the synthesized optimal sub-channel:

$$P = C_{n_{PMI}} \quad (7)$$

Step 706: The transmitter transmits the optimal PMI value $n_{PMI}$ to the relay stations RS1 and RS2.

Step 707: The relay stations RS1 and RS2 respectively obtain the pre-coding matrix P of the synthesized optimal sub-channel according to the optimal PMI value $n_{PMI}$ and the codebook C that is negotiated with the transmitter.

Step 708: The relay stations RS1 and RS2 respectively implement correct decoding on received data according to the pre-coding matrix P of the synthesized optimal sub-channel.

With the pre-coding method in the cooperative relay system according to this embodiment of the present invention, the transmitter can obtain the pre-coding matrix of the synthesized optimal sub-channel according to the pre-coding matrixes of the local optimal sub-channels which are from the transmitter to respective relay stations, and transmit data that is coded through the pre-coding matrix of the synthesized optimal sub-channel to respective relay stations, and therefore, performance of point to multipoint transmission of a first hop in the cooperative relay system is improved, so that respective relay stations have similar and optimal performance, thus ensuring cooperative transmission performance of a second hop, and realizing optimal pre-processing of the transmitter. In addition, the transmitter can transmit the optimal PMI value to respective relay stations, so that respective relay stations respectively obtain the pre-coding matrix of the synthesized optimal sub-channel according to the optimal PMI value, so as to implement correct decoding, thus ensuring correct receiving and transmitting of data in the cooperative relay system, and reducing a feedback overhead of the system.

Figure 8:
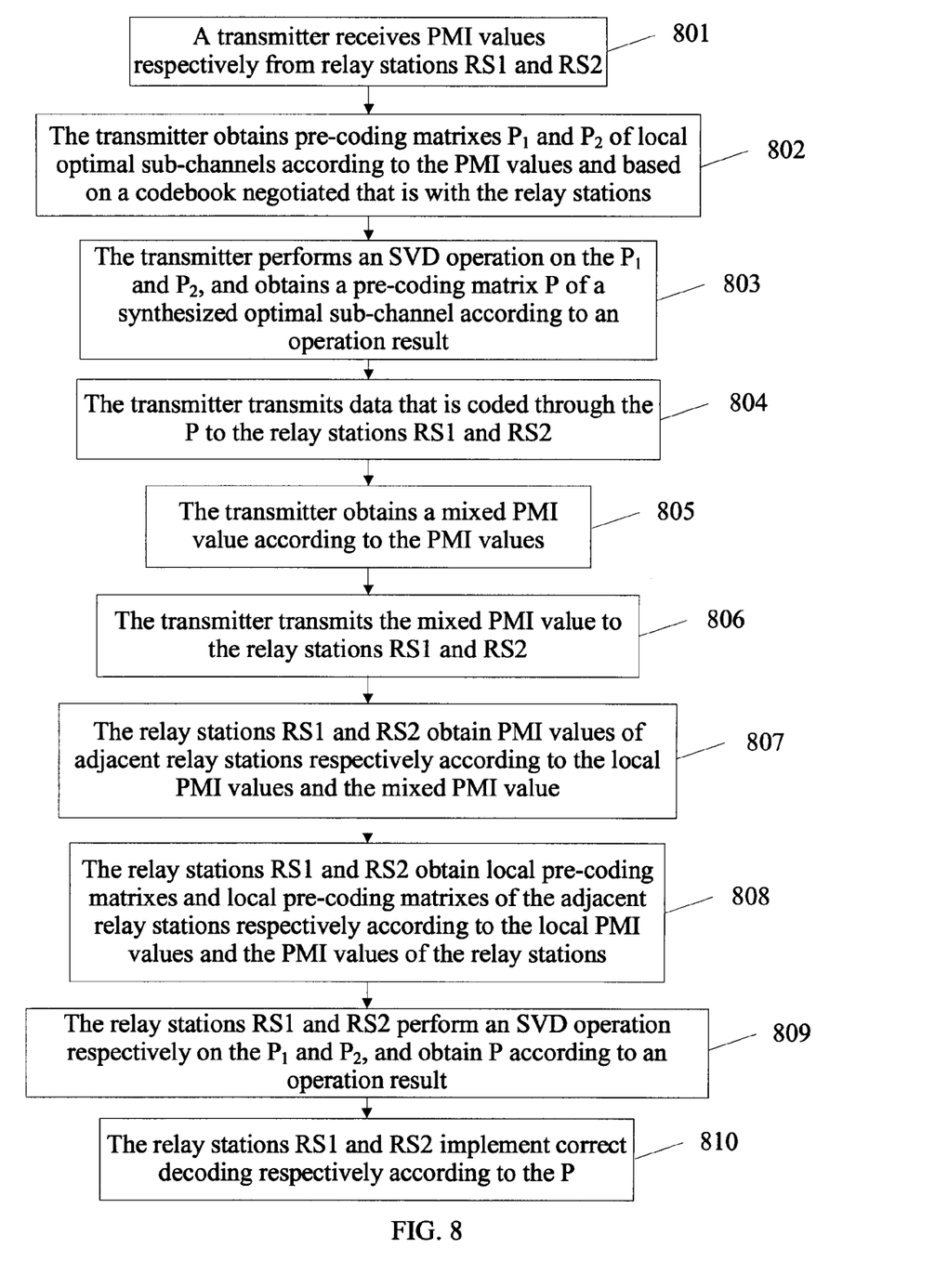
Figure 8A:
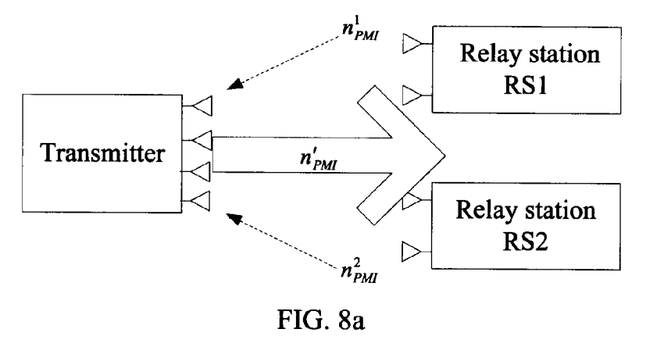

As shown in FIG. 8, an embodiment of the present invention provides a pre-coding method in a cooperative relay system. As shown in FIG. 8a, the cooperative relay system includes two relay stations RS1 and RS2, and a transmitter respectively receives local PMI values $n_{PMI}^1$ and $n_{PMI}^2$ which are transmitted by the relay stations RS1 and RS2, and transmits a mixed PMI value $n'_{PMI}$ to the relay stations RS1 and RS2.

As shown in FIG. 8, the pre-coding method in the cooperative relay system includes:

Steps 801 to 802: Referring to steps 601 to 602, determine a pre-coding matrix of each local optimal sub-channel through PMI values which are transmitted by the relay stations.

Steps 803 to 804: Referring to steps 503 to 504, obtain a pre-coding matrix P of a synthesized optimal sub-channel according to obtained $P_1$ and $P_2$.

Furthermore, in this embodiment of the present invention, the transmitter may feed pre-coding information that is adopted by the transmitter back to the relay stations, so that the relay stations implement correct decoding. Therefore, this embodiment of the present invention may further include:

Step 805: The transmitter obtains a mixed PMI value $n'_{PMI}$ according to the PMI values $n_{PMI}^1$ and $n_{PMI}^2$:

$$n'_{PMI} = n_{PMI}^1 \oplus n_{PMI}^2 \qquad (8)$$

Step 806: The transmitter transmits the mixed PMI value $n'_{PMI}$ to the relay stations RS1 and RS2.

Step 807: The relay stations RS1 and RS2 already know the PMI values $n_{PMI}^1$ and $n_{PMI}^2$ which are corresponding to respective local pre-coding, and therefore, the relay stations RS1 and RS2 perform a logic operation through the PMI values $n_{PMI}^1$ and $n_{PMI}^2$ which are corresponding to respective local pre-coding, and the mixed PMI value $n'_{PMI}$, so as to obtain PMI values $\tilde{n}_{PMI}^1$ and $\tilde{n}_{PMI}^2$ which are corresponding to local pre-coding of an adjacent relay station:

$$\begin{cases} \tilde{n}_{PMI}^1 = n_{PMI}^1 \oplus n'_{PMI} = (n_{PMI}^1 \otimes n_{PMI}^1) \otimes n_{PMI}^2 = n_{PMI}^2 \\ \tilde{n}_{PMI}^2 = n_{PMI}^2 \otimes n'_{PMI} = (n_{PMI}^2 \otimes n_{PMI}^2) \otimes n_{PMI}^1 = n_{PMI}^1 \end{cases} \qquad (9)$$

where, $\tilde{n}_{PMI}^1$ represents a PMI value that is corresponding to local pre-coding of the relay station adjacent to the relay station RS1, and $\tilde{n}_{PMI}^2$ represents a PMI value that is corresponding to local pre-coding of the relay station adjacent to the relay station RS2.

Step 808: The relay stations RS1 and RS2 obtain respective local pre-coding matrixes and local pre-coding matrixes $P_1$ and $P_2$ of the adjacent relay station:

$$\begin{cases} P_1 = C_{\tilde{n}_{PMI}^x} \\ P_2 = C_{\tilde{n}_{PMI}^x} \end{cases} \qquad (10)$$

where, x is 1 or 2.

Step 809: As shown in formula (4), the relay stations RS1 and RS2 respectively perform an SVD operation on the $P_1$ and $P_2$, and according to a result of the SVD operation, the relay stations RS1 and RS2 obtain the pre-coding matrix P of the synthesized optimal sub-channel.

Step 810: The relay stations RS1 and RS2 implement correct decoding on received data respectively according to the pre-coding matrix P of the synthesized optimal sub-channel.

In preceding embodiments of the present invention, a relay system including two relay stations is taken as an example. However, the method according to the embodiments of the present invention is not limited to be applied in the relay system that includes only two relay stations, and may be applied in a relay system that includes more than two relay stations.

With the pre-coding method in the cooperative relay system according to this embodiment of the present invention, the transmitter can obtain the pre-coding matrix of the synthesized optimal sub-channel according to the pre-coding matrixes of the local optimal sub-channels which are from the transmitter to respective relay stations, and transmit data that is coded through the pre-coding matrix of the synthesized optimal sub-channel to respective relay stations, and therefore, performance of point to multipoint transmission of a first hop in the cooperative relay system is improved, so that respective relay stations have similar and optimal performance, thus ensuring cooperative transmission performance of a second hop, and realizing optimal pre-processing of the transmitter. In addition, the transmitter can transmit a mixed PMI value to respective relay stations, so that respective relay stations obtain the pre-coding matrix of the synthesized optimal sub-channel according to the mixed PMI value, so as to implement correct decoding, thus ensuring correct receiving and transmitting of data in the cooperative relay system, and reducing a feedback overhead of the system.

Figure 9:
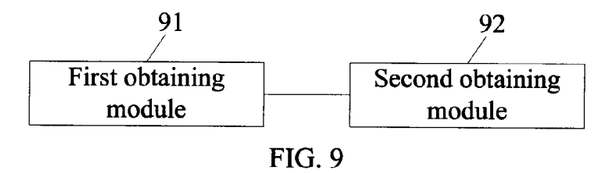
FIG. 9 is a schematic structural diagram of a communication apparatus according to an embodiment of the present invention.

As shown in FIG. 9, a communication apparatus is provided according to an embodiment of the present invention. The communication apparatus includes:

a first obtaining module 91, configured to obtain pre-coding matrixes of local optimal sub-channels which are from the communication apparatus to respective relay stations; and a second obtaining module 92, configured to obtain a pre-coding matrix of a synthesized optimal sub-channel according to the pre-coding matrix of each local optimal sub-channel, where the pre-coding matrix of each local optimal sub-channel is obtained by the first obtaining module 91.

With the communication apparatus according to this embodiment of the present invention, the communication apparatus can obtain the pre-coding matrix of the synthesized optimal sub-channel according to the pre-coding matrixes of the local optimal sub-channels to respective relay stations. Compared with the prior art, the communication apparatus can transmit data that is coded through the pre-coding matrix of the synthesized optimal sub-channel to different relay stations simultaneously through the synthesized optimal sub-channel, and therefore, performance of point to multipoint transmission of a first hop in a cooperative relay system is improved, so that respective relay stations have similar and optimal performance, thus ensuring cooperative transmission performance of a second hop, and realizing optimal pre-processing of the communication apparatus.

Figure 10:
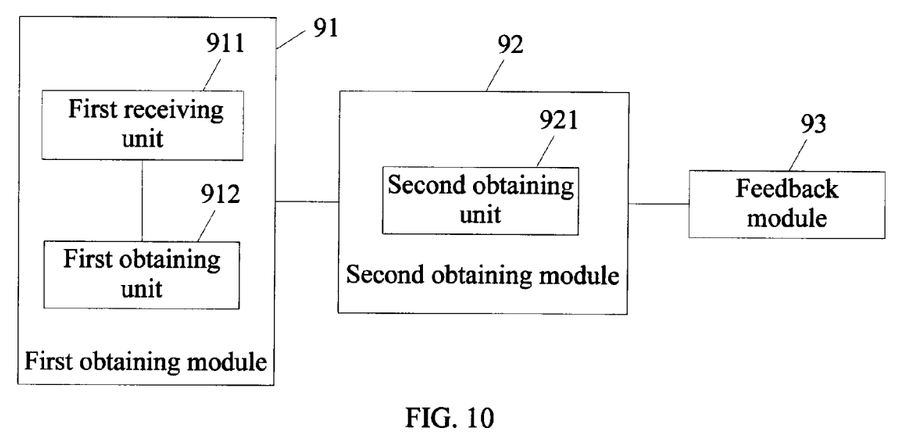
FIG. 10 and FIG. 11 are schematic structural diagrams of a communication apparatus according to an embodiment of the present invention.
Figure 11:
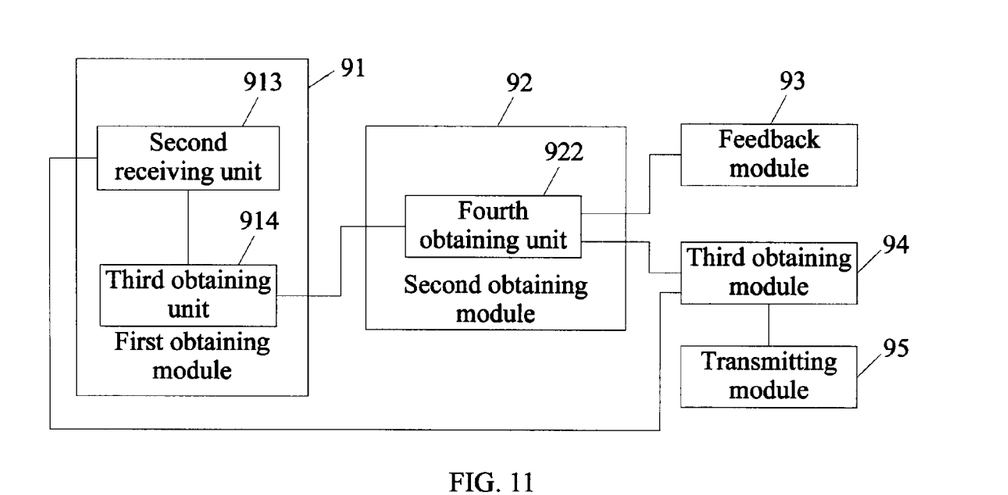

As shown in FIG. 10 and FIG. 11, a communication apparatus is provided according to an embodiment of the present invention. The communication apparatus includes:

a first obtaining module 91, configured to obtain pre-coding matrixes of local optimal sub-channels which are from the communication apparatus to respective relay stations; and a second obtaining module 92, configured to obtain a pre-coding matrix of a synthesized optimal sub-channel according to the pre-coding matrix of each local optimal sub-channel obtained by the first obtaining module 91.

As shown in FIG. 10, the first obtaining module 91 may include:

a first receiving unit 911, configured to receive channel information of a single link which is from the communication apparatus to respective relay stations, where the channel information of the single link is sent by respective relay stations; and a first obtaining unit 912, configured to perform an SVD operation on the channel information of the single link, where the channel information of the single link is received by the first receiving unit 911, and obtain the pre-coding matrix of each local optimal sub-channel according to a result of the SVD operation.

The second obtaining module 92 may include:

a second obtaining unit 921, configured to perform an SVD operation on the pre-coding matrix of each local optimal sub-channel, where the pre-coding matrix of each local optimal sub-channel is obtained by the first obtaining unit 912, and obtain the pre-coding matrix of the synthesized optimal sub-channel according to a result of the SVD operation.

As shown in FIG. 11, the first obtaining module 91 may further include:

a second receiving unit 913, configured to receive indication values of the pre-coding matrixes that are transmitted by respective relay stations; and a third obtaining unit 914, configured to obtain the pre-coding matrix of each local optimal sub-channel according to the indication values of the pre-coding matrixes and based on a codebook negotiated by the communication apparatus with the relay stations, where the indication values of the pre-coding matrixes is received by the second receiving unit 913.

The second obtaining module 92 may further include:

a fourth obtaining unit 922, configured to perform an SVD operation on the pre-coding matrix of each local optimal sub-channel, where the pre-coding matrix of each local optimal sub-channel is obtained by the third obtaining unit 914, and obtain the pre-coding matrix of the synthesized optimal sub-channel according to a result of the SVD operation.

As shown in FIG. 10 and FIG. 11, the communication apparatus may further include:

a feedback module 93, configured to feed the pre-coding matrix of the synthesized optimal sub-channel back to respective relay stations through a dedicated reference signal.

As shown in FIG. 11, the communication apparatus may further include:

a third obtaining module 94, configured to obtain an indication value of an optimal pre-coding matrix according to the pre-coding matrix of the synthesized optimal sub-channel and the codebook negotiated with the relay stations, where pre-coding matrix of the synthesized optimal sub-channel is obtained by the fourth obtaining unit 922; and a transmitting module 95, configured to transmit the indication value of the optimal pre-coding matrix to respective relay stations.

As shown in FIG. 11, the third obtaining module 94 is further configured to obtain an indication value of a mixed pre-coding matrix according to the indication values of the pre-coding matrixes, where the indication values of the pre-coding matrixes is received by the second receiving unit 913; and the transmitting module 95 is further configured to transmit the indication value of the mixed pre-coding matrix to respective relay stations.

With the communication apparatus according to this embodiment of the present invention, the communication apparatus can obtain the pre-coding matrix of the synthesized optimal sub-channel according to the pre-coding matrixes of the local optimal sub-channels to respective relay stations, so that the communication apparatus can transmit data that is coded through the pre-coding matrix of the synthesized optimal sub-channel to different relay stations simultaneously through the pre-coding matrix of the synthesized optimal sub-channel. Therefore, performance of point to multipoint transmission of a first hop in a cooperative relay system is improved, so that respective relay stations have similar and optimal performance, thus ensuring cooperative transmission performance of a second hop, and realizing optimal pre-processing of the communication apparatus. In addition, the communication apparatus can feed the pre-coding matrix of the synthesized optimal sub-channel back to respective relay stations, or transmit an optimal PMI value or a mixed PMI value to respective relay stations, so that respective relay stations obtain the pre-coding matrix of the synthesized optimal sub-channel according to the optimal PMI value or the mixed PMI value, and respective relay stations can implement correct decoding, thus ensuring correct receiving and transmitting of data in the cooperative relay system, and reducing a feedback overhead of the system.

Figure 12:
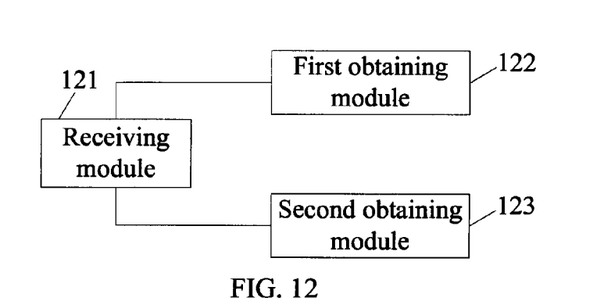
FIG. 12 is a schematic structural diagram of a relay apparatus according to an embodiment of the present invention.

As shown in FIG. 12, a relay apparatus is provided according to an embodiment of the present invention. The relay apparatus includes:

a receiving module 121, configured to receive data that is coded through a pre-coding matrix of a synthesized optimal sub-channel and transmitted by a transmitter, where the pre-coding matrix of the synthesized optimal sub-channel is determined through pre-coding matrixes of local optimal sub-channels which are from the transmitter to respective relay apparatuses.

With the relay apparatus according to this embodiment of the present invention, the relay apparatus can receive the data that is coded through the pre-coding matrix of the synthesized optimal sub-channel and transmitted by the transmitter, and the pre-coding matrix of the synthesized optimal sub-channel is determined through the pre-coding matrixes of local optimal sub-channels which are from the transmitter to respective relay apparatuses. Compared with the prior art, different relay apparatuses can receive the data that is coded through the pre-coding matrix of the synthesized optimal sub-channel and transmitted by the transmitter simultaneously through the synthesized optimal sub-channel, and therefore, performance of point to multipoint transmission of a first hop in a cooperative relay system is improved, so that respective relay apparatuses have similar and optimal performance, thus ensuring cooperative transmission performance of a second hop, and realizing that different relay apparatuses receive data with similarly good transmission performance.

As shown in FIG. 12, the relay apparatus may further include:

a receiving module 121, configured to receive data that is coded through a pre-coding matrix of a synthesized optimal sub-channel and transmitted by a transmitter;

where the pre-coding matrix of the synthesized optimal sub-channel is determined through pre-coding matrixes of local optimal sub-channels which are from the transmitter to respective relay apparatuses.

The receiving module 121 is further configured to receive the pre-coding matrix of the synthesized optimal sub-channel that is transmitted by the transmitter through a dedicated reference signal.

The receiving module 121 is further configured to receive an indication value of an optimal pre-coding matrix, where the indication value of the optimal pre-coding matrix is transmitted by the transmitter; and the relay apparatus further includes a first obtaining module 122, configured to obtain the pre-coding matrix of the synthesized optimal sub-channel according to the indication value of the optimal pre-coding matrix and a codebook that is negotiated with the transmitter.

The receiving module 121 is further configured to receive an indication value of a mixed pre-coding matrix, where the indication value of the mixed pre-coding matrix is transmitted by the transmitter; and the relay apparatus further includes a second obtaining module 123, configured to perform a logic operation on an indication value of a pre-coding matrix that is corresponding to local pre-coding and the indication value of the mixed pre-coding matrix, so as to obtain an indication value of a pre-coding matrix of an adjacent relay apparatus; obtain a local pre-coding matrix and a local pre-coding matrix of the adjacent relay apparatus according to the indication value of the pre-coding matrix that is corresponding to the local pre-coding, and the indication value of the pre-coding matrix that is corresponding to the local pre-coding of the adjacent relay apparatus; and perform an SVD operation on the local pre-coding matrix and the local pre-coding matrix of the adjacent relay apparatus, and obtain the pre-coding matrix of the synthesized optimal sub-channel according to a result of the SVD operation.

With the relay apparatus according to this embodiment of the present invention, the relay apparatus can receive the data that is coded through the pre-coding matrix of the synthesized optimal sub-channel and transmitted by the transmitter, and the pre-coding matrix of the synthesized optimal sub-channel is determined through pre-coding matrixes of local optimal sub-channels which are from the transmitter to respective relay apparatuses. Therefore, performance of point to multi-point transmission of a first hop in a cooperative relay system is improved, so that respective relay apparatuses have similar and optimal performance, thus ensuring cooperative transmission performance of a second hop, and realizing that different relay apparatuses receive data with similarly good transmission performance. In addition, the relay apparatuses can receive the pre-coding matrix of the synthesized optimal sub-channel that is fed back by the transmitter, or receive an optimal PMI value or a mixed PMI value, where the optimal PMI value or the mixed PMI value is transmitted by the transmitter, and obtain the pre-coding matrix of the synthesized optimal sub-channel according to the optimal PMI value or the mixed PMI value, so as to realize correct decoding, thus ensuring correct receiving and transmitting of data in the cooperative relay system, and reducing a feedback overhead of the system.

The communication apparatus and the relay apparatus which are provided in the embodiments of the present invention may implement the method embodiments provided in the preceding. The method, the communication apparatus, and the relay apparatus which are provided in the embodiments of the present invention may be applied to, but are not limited to, pre-coding between a transmitter and a relay station in a cooperative relay system.

Persons of ordinary skill in the art may understand that all or a part of the steps of the method according to the preceding embodiments may be implemented by a computer program instructing relevant hardware. The program may be stored in a computer readable storage medium. When the program runs, the steps of the method according to the preceding embodiments are performed. The storage medium may be a magnetic disk, an optical disk, a read-only memory (ROM) or a random access memory (RAM).

The preceding descriptions are merely specific embodiments of the present invention, but are not intended to limit the protection scope of the present invention. Changes or replacements easily figured out by persons skilled in the prior art within the technical scope disclosed by the present invention shall all fall within the protection scope of the present invention. Therefore, the protection scope of the present invention shall be subject to the protection scope of the appended claims.

What is claimed is:

1. A pre-coding method in a cooperative relay system, the method comprising:
   obtaining, by a transmitter, pre-coding matrixes of local optimal sub-channels which are from the transmitter to respective relay stations, according to receipt, from the respective relay stations, of channel information of single links, a single link including sub-channels, between the transmitter and the respective relay stations; and
   obtaining, by the transmitter, a pre-coding matrix of a synthesized optimal sub-channel between the transmitter and a relay station, according to a Singular Value Decomposition (SVD) operation on the pre-coding matrixes of the local optimal sub-channels between the transmitter and the relay stations,
   the pre-coding matrix of the synthesized optimal sub-channel transmitted, by the transmitter, to the respective relay stations through a Dedicated Reference Signal (DRS).

2. The method according to claim 1, wherein obtaining the pre-coding matrixes of the local optimal sub-channels according to the receipt of the channel information from the respective relay stations comprises:
   performing the SVD operation on the channel information of the single links; and
   obtaining the pre-coding matrixes of the local optimal sub-channels according to a result of the SVD operation on the channel information of single links.

3. The method according to claim 1, wherein obtaining the pre-coding matrixes of the local optimal sub-channels according to the receipt of the channel information from the respective relay stations comprises:
   receiving indication values of the pre-coding matrixes from the respective relay stations; and
   obtaining the pre-coding matrixes of the local optimal sub-channels according to the indication values of the pre-coding matrixes and a codebook that is negotiated by the transmitter and the respective relay stations.

4. The method according to claim 3, the method further comprising:
   obtaining an indication value of an optimal pre-coding matrix according to the pre-coding matrix of the synthesized optimal sub-channel and the codebook that is negotiated by the transmitter and the respective relay stations; and
   transmitting the indication value of the optimal pre-coding matrix to the respective relay stations.

5. The method according to claim 3, wherein the method further comprising:
   obtaining an indication value of a mixed pre-coding matrix according to the indication values of the pre-coding matrixes; and
   transmitting the indication value of the mixed pre-coding matrix to the respective relay stations.

6. A communication apparatus, comprising:
   a first obtaining module, configured to obtain pre-coding matrixes of local optimal sub-channels which are from the communication apparatus to respective relay stations, according to receipt, from the respective relay stations, of channel information of single links, a single link including sub-channels, between the transmitter and the respective relay stations;
   a second obtaining module, configured to obtain a pre-coding matrix of a synthesized optimal sub-channel between the transmitter and a relay station, according to a Singular Value Decomposition (SVD) operation on the pre-coding matrixes of the local optimal sub-channels between the transmitter and the relay stations; and a feedback module, configured to feed the pre-coding matrix of the synthesized optimal sub-channel back to the respective relay stations through a Dedicated Reference Signal (DRS).

7. The communication apparatus according to claim 6, wherein the first obtaining module is configured to:

perform the SVD operation on the channel information of the single links, and obtain the pre-coding matrixes of the local optimal sub-channels according to a result of the SVD operation on the channel information of the single links.

8. The communication apparatus according to claim 6, wherein the first obtaining module is configured to:

receive indication values of the pre-coding matrixes from the respective relay stations; and obtain the pre-coding matrixes of the local optimal sub-channels according to the indication values of the pre-coding matrixes and a codebook that is negotiated by the communication apparatus with the respective relay stations.

9. The communication apparatus according to claim 8, further comprising:

a third obtaining module, configured to obtain an indication value of an optimal pre-coding matrix according to the pre-coding matrix of the synthesized optimal sub-channel and the codebook that is negotiated with the respective relay stations; and a transmitting module, configured to transmit the indication value of the optimal pre-coding matrix to the respective relay stations.

10. The communication apparatus according to claim 8, further comprising:

a third obtaining module, configured to obtain an indication value of a mixed pre-coding matrix according to the received indication values of the pre-coding matrixes; and a transmitting module, configured to transmit the indication value of the mixed pre-coding matrix to the respective relay stations.

11. A relay apparatus, comprising:

a receiving module, configured to receive data that is coded through a pre-coding matrix of a synthesized optimal sub-channel from a transmitter, wherein the pre-coding matrix of the synthesized optimal sub-channel is determined by the transmitter through obtained pre-coding matrixes of local optimal sub-channels which are from the transmitter to respective relay apparatuses, according to receipt, from the respective relay apparatuses, of channel information of single links, a single link including sub-channels, between the transmitter and the respective relay apparatuses, and a Singular Value Decomposition (SVD) operation on pre-coding matrixes of local optimal sub-channels between the transmitter and the respective relay apparatuses, the relay apparatus is one of the respective relay apparatuses, and wherein the receiving module is further configured to receive the pre-coding matrix of the synthesized optimal sub-channel from the transmitter through a Dedicated Reference Signal (DRS).

12. The relay apparatus according to claim 11, wherein the receiving module is further configured to receive an indication value of an optimal pre-coding matrix from the transmitter; and the relay apparatus further comprises a first obtaining module, configured to obtain the pre-coding matrix of the synthesized optimal sub-channel according to the indication value of the optimal pre-coding matrix and a codebook that is negotiated by the respective relay apparatuses with the transmitter.

13. The relay apparatus according to claim 11, wherein the receiving module is further configured to receive an indication value of a mixed pre-coding matrix from the transmitter; and the relay apparatus further comprises a second obtaining module, configured to perform a logic operation on an indication value of a pre-coding matrix that is corresponding to local pre-coding and the indication value of the mixed pre-coding matrix, obtain an indication value of a pre-coding matrix of an adjacent relay apparatus; obtain a local pre-coding matrix and a local pre-coding matrix of the adjacent relay apparatus according to the indication value of the pre-coding matrix that is corresponding to the local pre-coding and the indication value of the pre-coding matrix that is corresponding to the local pre-coding of the adjacent relay apparatus; and perform the SVD operation on the local pre-coding matrix and the local pre-coding matrix of the adjacent relay apparatus, and obtain the pre-coding matrix of the synthesized optimal sub-channel according to a result of the SVD operation on the local pre-coding matrix and the local pre-coding matrix of the adjacent relay apparatus.

* * * * *